(12) United States Patent
Toba et al.

(10) Patent No.: US 11,341,398 B2
(45) Date of Patent: May 24, 2022

(54) RECOGNITION APPARATUS AND LEARNING SYSTEM USING NEURAL NETWORKS

(71) Applicant: HITACHI, LTD., Tokyo (JP)

(72) Inventors: Tadanobu Toba, Tokyo (JP); Takumi Uezono, Tokyo (JP); Kenichi Shimbo, Tokyo (JP); Goichi Ono, Tokyo (JP)

(73) Assignee: HITACHI, LTD., Tokyo (JP)

( * ) Notice: Subject to any disclaimer, the term of this patent is extended or adjusted under 35 U.S.C. 154(b) by 918 days.

(21) Appl. No.: 15/453,482

(22) Filed: Mar. 8, 2017

(65) Prior Publication Data

US 2018/0096245 A1    Apr. 5, 2018

(30) Foreign Application Priority Data

Oct. 3, 2016  (JP) .............................. JP2016-195629

(51) Int. Cl.
*G06N 3/063* (2006.01)
*G06N 3/04* (2006.01)

(52) U.S. Cl.
CPC ........... *G06N 3/063* (2013.01); *G06N 3/0454* (2013.01)

(58) Field of Classification Search
CPC ........ G06N 3/063; G06N 3/0454; G06N 3/08; G06N 20/00
See application file for complete search history.

(56) References Cited

U.S. PATENT DOCUMENTS 4,972,473 A  *  11/1990  Ejiri  ....................... H04N 1/448
                                                     380/243
5,285,523 A  *  2/1994  Takahashi  ........... F16H 61/0213
                                                     706/20
(Continued)

FOREIGN PATENT DOCUMENTS

CN      105137970 A  *  12/2015
CN      106228240 A  *  12/2016
(Continued)

OTHER PUBLICATIONS

Han et al., "EIE: Efficient Inference Engine on Compressed Deep Neural Network" Jun. 18, 2016, ACM/IEEE 43rd Annual International Symposium on Computer Architecture, pp. 243-254. (Year: 2016).*

(Continued)

*Primary Examiner* — Miranda M Huang
*Assistant Examiner* — Chase P. Hinckley
(74) *Attorney, Agent, or Firm* — Baker Botts L.L.P.

(57) ABSTRACT

Learning data of a usage environment can be efficiently collected. A recognition apparatus includes: a first neural network configured to receive input of data; a second neural network configured to receive input of the data, the second neural network having a different structure from a structure of the first neural network; a comparison unit configured to compare a first output result of the first neural network and a second output result of the second neural network; and a communication unit configured to wirelessly transmit the data to a host system configured to learn the data when a comparison result between the first output result and the second output result is different by a predetermined standard or more.

7 Claims, 14 Drawing Sheets

(56) References Cited

U.S. PATENT DOCUMENTS

| | | | | | |
|---|---|---|---|---|---|
| 5,377,108 | A | * | 12/1994 | Nishio | G06N 3/0454 |
| | | | | | 701/45 |
| 5,434,783 | A | * | 7/1995 | Pal | G05B 13/027 |
| | | | | | 701/36 |
| 5,577,166 | A | * | 11/1996 | Mizuno | G06K 9/6254 |
| | | | | | 706/20 |
| 5,586,028 | A | * | 12/1996 | Sekine | B60T 8/174 |
| | | | | | 701/1 |
| 5,895,435 | A | * | 4/1999 | Ohta | F16H 61/0213 |
| | | | | | 477/120 |
| 8,694,451 | B2 | * | 4/2014 | Sasagawa | G06N 3/063 |
| | | | | | 706/25 |
| 9,336,483 | B1 | | 5/2016 | Abeysooriya | G06N 3/08 |
| 9,760,806 | B1 | * | 9/2017 | Ning | G06T 7/277 |
| 9,760,827 | B1 | * | 9/2017 | Lin | G06N 3/063 |
| 9,902,401 | B2 | * | 2/2018 | Stein | B60W 40/06 |
| 10,001,760 | B1 | | 6/2018 | Hoffmann | G05B 13/048 |
| 10,169,932 | B2 | * | 1/2019 | Ishikawa | G06N 5/04 |
| 10,453,454 | B2 | * | 10/2019 | Homma | G06F 40/30 |
| 10,572,742 | B2 | * | 2/2020 | Hoare | G06K 9/00798 |
| 10,611,379 | B2 | * | 4/2020 | Olabiyi | G06N 3/084 |
| 10,621,486 | B2 | * | 4/2020 | Yao | G06F 7/5443 |
| 10,643,124 | B2 | * | 5/2020 | Yu | G06N 3/0454 |
| 10,664,283 | B2 | * | 5/2020 | Guo | G06F 9/30145 |
| 10,698,657 | B2 | * | 6/2020 | Kang | G06F 7/5443 |
| 10,802,992 | B2 | * | 10/2020 | Yu | G06N 3/063 |
| 10,803,602 | B2 | * | 10/2020 | Kim | G06K 9/6215 |
| 2004/0162644 | A1 | * | 8/2004 | Torii | G05D 1/0825 |
| | | | | | 701/1 |
| 2008/0144944 | A1 | * | 6/2008 | Breed | G06K 9/00832 |
| | | | | | 382/224 |
| 2010/0082126 | A1 | * | 4/2010 | Matsushita | G05B 13/027 |
| | | | | | 700/48 |
| 2013/0289836 | A1 | * | 10/2013 | Li | B60W 10/30 |
| | | | | | 701/51 |
| 2015/0066495 | A1 | * | 3/2015 | Zhang | G10L 15/02 |
| | | | | | 704/231 |
| 2015/0088398 | A1 | * | 3/2015 | Cui | F02D 41/1448 |
| | | | | | 701/101 |
| 2015/0199617 | A1 | * | 7/2015 | Kuwajima | G06K 9/00791 |
| | | | | | 706/20 |
| 2015/0269483 | A1 | * | 9/2015 | Nishitani | G06N 3/084 |
| | | | | | 706/25 |
| 2015/0344036 | A1 | * | 12/2015 | Kristinsson | B60W 40/06 |
| | | | | | 701/22 |
| 2016/0020943 | A1 | * | 1/2016 | Diab | H04L 67/327 |
| | | | | | 714/4.12 |
| 2016/0078339 | A1 | * | 3/2016 | Li | G06N 7/005 |
| | | | | | 706/20 |
| 2016/0179434 | A1 | * | 6/2016 | Herrero Abellanas | G06T 1/60 |
| | | | | | 711/155 |
| 2016/0267324 | A1 | * | 9/2016 | Shoaib | G06K 9/00536 |
| 2016/0328644 | A1 | * | 11/2016 | Lin | G06N 3/084 |
| 2017/0076195 | A1 | * | 3/2017 | Yang | G06N 3/063 |
| 2017/0083829 | A1 | * | 3/2017 | Kang | G06N 3/0454 |
| 2017/0126711 | A1 | * | 5/2017 | Jung | H04L 63/1425 |
| 2017/0147905 | A1 | * | 5/2017 | Huang | G06K 9/6232 |
| 2017/0206426 | A1 | * | 7/2017 | Schrier | G06K 9/6273 |
| 2017/0236027 | A1 | * | 8/2017 | van der Made | G06N 3/063 |
| | | | | | 382/158 |
| 2017/0259801 | A1 | * | 9/2017 | Abou-Nasr | B60W 10/18 |
| 2017/0267177 | A1 | * | 9/2017 | Nariyambut Murali | |
| | | | | | G06K 9/4628 |
| 2017/0293837 | A1 | * | 10/2017 | Cosatto | G06K 9/00805 |
| 2017/0300763 | A1 | * | 10/2017 | Zou | G06K 9/6271 |
| 2017/0300813 | A1 | * | 10/2017 | Lee | G06N 3/0454 |
| 2017/0364757 | A1 | * | 12/2017 | Rajabizadeh | G06V 30/194 |
| 2018/0025268 | A1 | * | 1/2018 | Teig | G06N 3/063 |
| | | | | | 706/25 |
| 2018/0032082 | A1 | * | 2/2018 | Shalev-Shwartz | |
| | | | | | G01C 21/3453 |
| 2018/0039853 | A1 | * | 2/2018 | Liu | G06K 9/72 |
| 2018/0046903 | A1 | * | 2/2018 | Yao | G06N 3/082 |
| 2018/0053093 | A1 | * | 2/2018 | Olabiyi | B60W 40/09 |
| 2018/0074493 | A1 | * | 3/2018 | Prokhorov | G05D 1/0274 |
| 2018/0089563 | A1 | * | 3/2018 | Redding | G06N 3/08 |
| 2018/0096457 | A1 | * | 4/2018 | Savvides | G06F 16/50 |
| 2019/0026626 | A1 | * | 1/2019 | Du | G06F 9/5027 |
| 2019/0087716 | A1 | * | 3/2019 | Du | G06N 3/063 |
| 2019/0122077 | A1 | * | 4/2019 | Tsishkou | G06K 9/6259 |
| 2019/0188567 | A1 | * | 6/2019 | Yao | G06N 3/08 |
| 2019/0250628 | A1 | * | 8/2019 | Rothhamel | G05D 1/0221 |
| 2020/0327367 | A1 | * | 10/2020 | Ma | G06N 3/063 |

FOREIGN PATENT DOCUMENTS

| | | | |
|---|---|---|---|
| JP | H05-290013 | A | 11/1993 |
| JP | H07-84984 | A | 3/1995 |
| JP | H09-91263 | A | 4/1997 |
| JP | 2010-086397 | A | 4/2010 |
| JP | 2012-108429 | A | 6/2012 |
| JP | 2015-135552 | A | 7/2015 |
| WO | WO-2017123665 | A1 * | 7/2017 ........... G07C 5/0808 |

OTHER PUBLICATIONS

Ho et al., "A novel fused neural network controller for lateral control of autonomous vehicles" Jul. 31, 2012, Applied Soft Computing, No. 12, pp. 3514-3525. (Year: 2012).*

Jia et al., "Obstacle detection in single images with deep neural networks" Dec. 18, 2015, pp. 1033-1040. (Year: 2015).*

Li et al., "Deep Neural Network for Structural Prediction and Lane Detection in Traffic Scene" Feb. 16, 2016, IEEE Transactions on Neural Networks and Learning Systems, vol. 28, No. 3, pp. 690-703. (Year: 2016).*

Khabou et al., "Automatic Target Detection Using Entropy Optimized Shared-Weight Neural Networks" Jan. 2000, IEEE Transactions on Neural Networks, vol. 11, No. 1, pp. 186-193. (Year: 2000).*

He et al., "SuperCNN: A Superpixelwise Convolutional Neural Network for Salient Object Detection" Apr. 8, 2015, International Journal of Computer Vision, No. 115, pp. 330-344. (Year: 2015).*

Dou et al., "Lane Changing Prediction at Highway Lane Drops Using Support Vector Machine and Artificial Neural Network Classifiers" Jul. 12, 2016, IEEE International Conference on Advanced Intelligent Mechatronics (AIM), pp. 901-906. (Year: 2016).*

Park et al., "Intelligent Vehicle Power Management through Neural Learning" 2010, IEEE. (Year: 2010).*

Dequaire et al., "Deep Tracking on the Move: Learning to Track the World from a Moving Vehicle using Recurrent Neural Networks" Sep. 29, 2016. (Year: 2016).*

Kahou et al., "RATM: Recurrent Attentive Tracking Model" Apr. 28, 2016, pp. 1-10. (Year: 2016).*

Ondruska et al., "End-to-End Tracking and Semantic Segmentation Using Recurrent Neural Networks" Apr. 2016. (Year: 2016).*

Finaev et al., "Design of the neuro-like learning control system for a vehicle" 2015, pp. 328-334. (Year: 2015).*

Aamer et al., "High-Speed Neural Network Controller for Autonomous Robot Navigation using FPGA" Jan. 2016, pp. 47-58. (Year: 2016).*

Farooq et al., "Design and Implementation of Neural Network Based Controller for Mobile Robot Navigation in Unknown Environments" Apr. 2014, pp. 83-89. (Year: 2014).*

Ortega-Zamorano et al., "Efficient Implementation of the Backpropagation Algorithm in FPGAs and Microcontrollers" Sep. 2016, pp. 1840-1850. (Year: 2016).*

Shapiro, Danny, "Accelerating the Race to Autonomous Cars" Aug. 13, 2016. (Year: 2016).*

Skende, Andi, "Introducing 'Parker' Next Generation Tegra System-on-Chip" Aug. 21, 2016. (Year: 2016).*

Chen et al., "Eyeriss: A Spatial Architecture for Energy-Efficient Dataflow for Convolutional Neural Networks" Jun. 18, 2016, pp. 367-379. (Year: 2016).*

Bojarski et al., "End to End Learning for Self-Driving Cars" Apr. 25, 2016, pp. 1-9. (Year: 2016).*

(56) References Cited

OTHER PUBLICATIONS

Tapiador et al., "Comprehensive Evaluation of OpenCL-based Convolutional Neural Network Accelerators in Xilinx and Altera FPGAs" Sep. 29, 2016. (Year: 2016).*
Chang et al., "Recurrent Neural Networks Hardware Implementation on FPGA" Mar. 4, 2016. (Year: 2016).*
Del Sozzo et al., "On the Automation of High Level Synthesis of Convolutional Neural Networks" May 23, 2016, pp. 217-224. (Year: 2016).*
Jain et al., "Recurrent Neural Networks for Driver Activity Anticipation via Sensory-Fusion Architecture" May 2016, pp. 3118-3125. (Year: 2016).*
Zhou et al., "DAVE: A Unified Framework for Fast Vehicle Detection and Annotation" Aug. 1, 2016, pp. 1-16. (Year: 2016).*
Guo et al., "Angel-Eye: A Complete Design Flow for Mapping CNN onto Customized Hardware" Jul. 11, 2016, pp. 24-29. (Year: 2016).*
Guo et al., "From Model to FPGA: Software-Hardware Co-Design for Efficient Neural Network Acceleration" Aug. 21, 2016. (Year: 2016).*
Ishikawa et al., "Prediction of Potential Human Intention Using Supervised Competitive Learning" Nov. 1, 2016, pp. 1-9. (Year: 2016).*
Notice of Reasons for Refusal, dated Feb. 18, 2020, which issued during the prosecution of Japanese Application No. 2016-195629, which corresponds to the present application (English translation attached).
Kurokawa, et al., "Development of neural networks using CPLD," Journal of the Institute of Electronics, Information and Communication Engineers, Mar. 25, 2000, vol. J83-D-II, vol. 3, pp. 1054 to 1059 (English translation attached).
H. Nakahara, "a second image recognition experiment on xFPGA introduction," Interface, CQ Publishing Co., Ltd., Sep. 1, 2016, vol. 42, No. 9, pp. 147 to 154 (English translation attached).

* cited by examiner

Fig.4

| [00] |
|------|
| [01] |
| [02] |
| [03] |
| ⋮ |
| [07] |
| ⋮ |
| [N] |

Fig.11
00 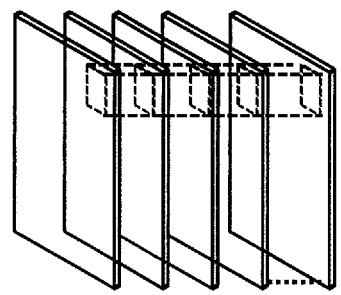
01 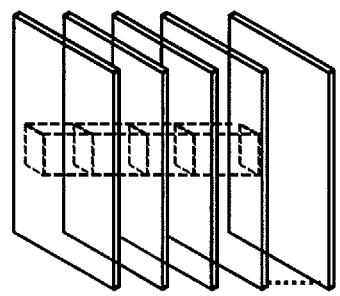
N 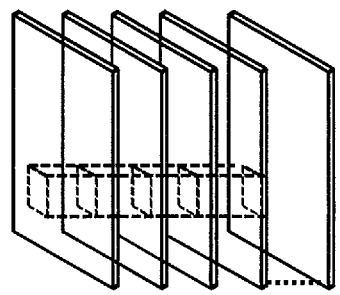

Fig.13
00 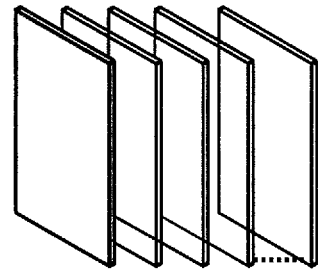
01 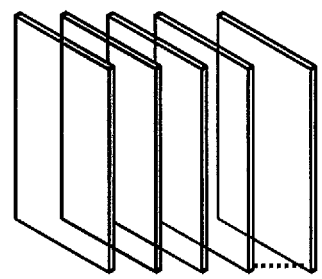
N 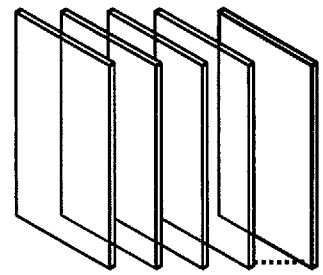

RECOGNITION APPARATUS AND LEARNING SYSTEM USING NEURAL NETWORKS

CROSS-REFERENCE TO RELATED APPLICATION

This application claims the priority based on the Japanese Patent Application No. 2016-195629 filed on Oct. 3, 2016.

TECHNICAL FIELD

The present invention relates to a recognition apparatus and a learning system.

BACKGROUND

In Japanese Patent Laid-open Publication No. H05-290013, there is disclosed "a neural network arithmetic apparatus capable of adapting to an actual environment while maintaining an initial capability". In Japanese Patent Laid-open Publication No. H07-84984, there is disclosed "a neural network circuit configured to perform image recognition processing, for example". In Japanese Patent Laid-open Publication No. H09-91263, there is described "a hierarchical neural network configured to combine neurons in a layer shape".

SUMMARY OF INVENTION

Technical Problem

The environment in which an automobile or other such vehicle travels changes day by day. Therefore, it is necessary for artificial intelligence implemented in the vehicle to collect new learning data that matches a usage environment that changes day by day.

It is also necessary for the artificial intelligence implemented in the vehicle to instantaneously recognize and judge danger during travel, for example. Therefore, it is important for the artificial intelligence implemented in the vehicle to efficiently collect the new learning data of the usage environment without placing a burden on danger recognition processing, for example.

In Japanese Patent Laid-open Publication Nos. H05-290013, H07-84984, and H09-91263, there is no description or disclosure regarding efficient collection of learning data of the usage environment.

In view of the above, it is an object of the present invention to provide a technology for efficiently collecting learning data of a usage environment.

Solution to Problem

The present invention includes a plurality of solving means for solving at least a part of the problem described above. Examples of those means include the following. In order to solve the above-mentioned problem, according to one embodiment of the present invention, there is provided a recognition apparatus, including: a first neural network configured to receive input of data; a second neural network configured to receive input of the data, the second neural network having a different structure from a structure of the first neural network; a comparison unit configured to compare a first output result of the first neural network and a second output result of the second neural network; and a communication unit configured to wirelessly transmit the data to a host system configured to learn the data when a comparison result between the first output result and the second output result is different by a predetermined standard or more.

Advantageous Effects of Invention

According to an embodiment of the present invention, learning data of a usage environment can be efficiently collected. The problem to be solved by the present invention, the configuration, and the advantageous effect other than those described above according to the present invention are made clear based on the following description of the embodiments.

BRIEF DESCRIPTION OF DRAWINGS

FIG. 4 is a table for showing a data configuration example of a sequence data memory.

FIG. 11 is a diagram for illustrating an example of a neural network structure stored in the reconfiguration data memory.

FIG. 13 is a diagram for illustrating an example of a neural network structure stored in the reconfiguration data memory.

Description of Embodiments

Embodiments of the present invention are now described with reference to the drawings. Herein, there is described an example in which a recognition apparatus according to the present invention is implemented by a field-programmable gate array (FPGA) or other such programmable logic device (PLD).

First Embodiment

Figure 1:
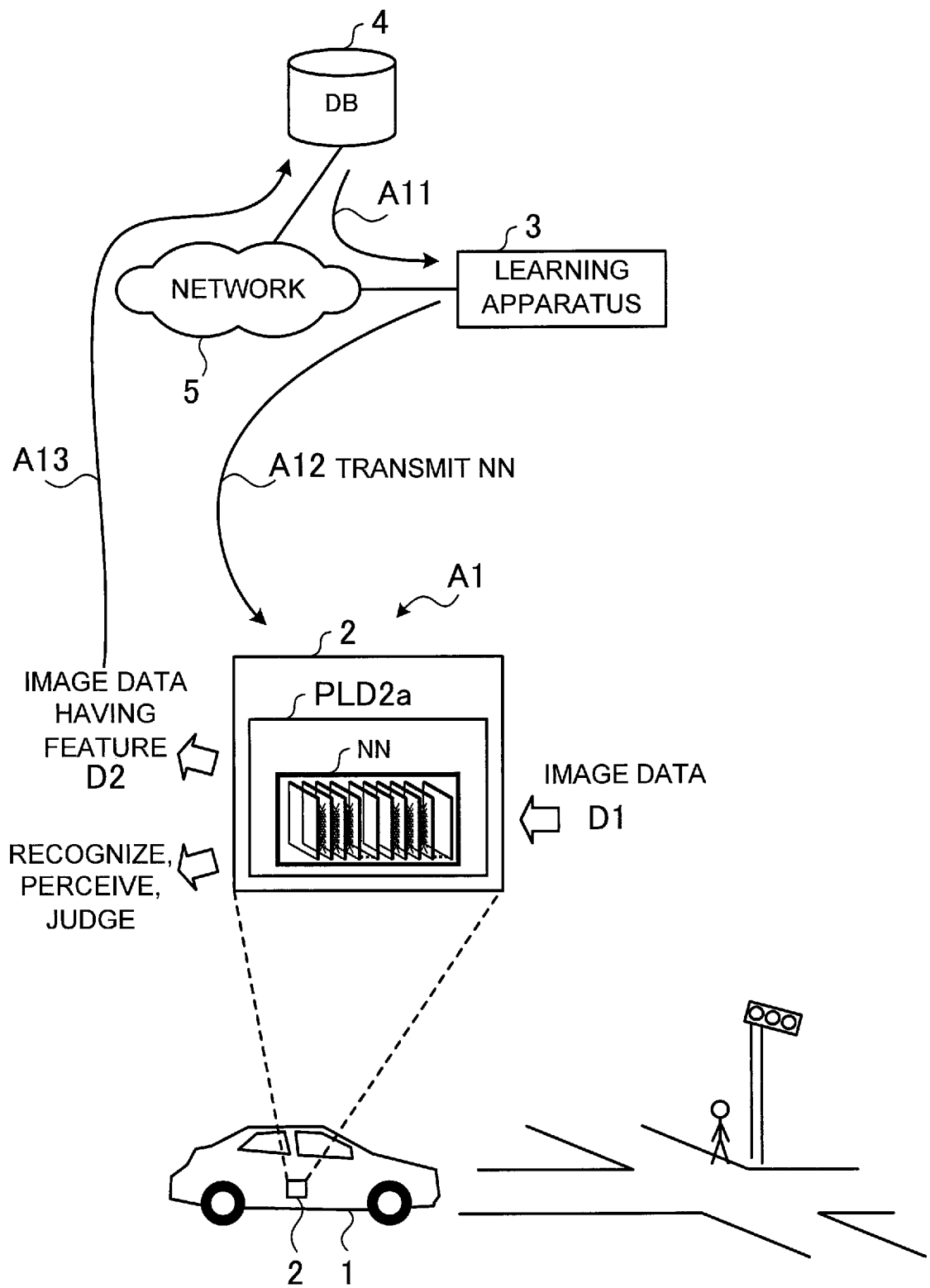
FIG. 1 is a diagram for illustrating an example of a learning system in which a PLD according to a first embodiment of the present invention is applied.

FIG. 1 is a diagram for illustrating an example of a learning system in which a PLD according to a first embodiment of the present invention is applied. As illustrated in FIG. 1, the learning system includes a vehicle 1, for example, an automobile, an electronic control unit (ECU) 2 included in the vehicle 1, a learning apparatus 3, and a data base (DB) 4. The ECU 2 is configured to access a network 5, which may be the Internet, for example, via wireless communication, for example, and to communicate to/from the learning apparatus 3 and the DB 4.

In FIG. 1, a box indicated by the arrow A1 is an enlarged view of the ECU 2 included in the vehicle 1. As indicated by the arrow A1, the ECU 2 includes a PLD 2a. The PLD 2a includes a neural network NN.

In the DB 4, learning data to be learned by the learning apparatus 3 is stored. The learning data is, for example, image data of a road, image data of a vehicle, for example, an automobile, a motorbike, or a bicycle, and image data of a road sign, for example. The DB 4 is managed by, for example, a data center or a cloud system.

The learning apparatus 3, which includes artificial intelligence, is configured to learn based on the learning data (i.e., image data) stored in the DB 4 (arrow A11 of FIG. 1). The learning apparatus 3 is configured to generate (determine), based on a learning result of the learning data, a structure of the neural network NN to be formed in the PLD 2a of the vehicle 1. The structure of the neural network NN is, for example, a connection relation between units or a weighting coefficient.

The learning apparatus 3 is configured to periodically learn image data of the DB 4, for example, once every few days to a few weeks to generate the structure of the neural network NN of the PLD 2a. The learning apparatus 3 is also configured to transmit the generated structure (i.e., information on the structure) of the neural network NN to the ECU 2 via the network 5 (arrow A12 of FIG. 1).

The ECU 2 is configured to receive from the learning apparatus 3 the structure of the neural network NN generated by the learning apparatus 3. The neural network NN having the structure transmitted from the learning apparatus 3 is formed in the PLD 2a included in the ECU 2. More specifically, the structure of the neural network NN of the PLD 2a of the vehicle 1 is periodically updated by the learning apparatus 3.

A camera (not shown) configured to photograph the surroundings of the vehicle 1, for example, a front direction of the vehicle 1, is mounted to the vehicle 1. Image data D1 photographed by the camera mounted to the vehicle 1 is input to the PLD 2a. The PLD 2a is configured to recognize (or perceive) and judge the input image data D1 by using the neural network NN generated by the learning apparatus 3.

For example, the PLD 2a is configured to recognize a state of a traffic crossing and pedestrians, or traffic signals, in the input image data D1, and judge whether or not there is a danger. The PLD 2a outputs, when it is judged that there is a danger in the input image data D1, an instruction to perform an avoidance action in order to avoid the danger. For example, the PLD 2a outputs a braking instruction when the vehicle 1 is likely to hit a vehicle in front.

The PLD 2a is also configured to extract image data D2, which has a feature, from among the input image data D1 by using the neural network NN. The extraction of the image data D2 is described in more detail later. The image data D2 having a feature is image data that has not been learned by the learning apparatus 3 (i.e., image data that has not been stored in the DB 4). The ECU 2 is configured to transmit the image data D2 having a feature extracted by the PLD 2a to the DB 4 via the network 5 (arrow A13 of FIG. 1). Specifically, the image data D2 judged as having a feature by the PLD 2a is stored in the DB 4.

The learning apparatus 3 is configured to learn the image data currently in the DB 4 to generate the structure of the neural network NN of the PLD 2a. However, the environment in which the vehicle 1 travels changes day by day. For example, automobile design and danger change day by day. Therefore, when a new automobile design or a new danger appears, the neural network NN of the PLD 2a may not correctly recognize the new automobile design or the new danger.

However, as described above, the PLD 2a is configured to extract the image data D2 having a feature (i.e., image data of an automobile having a new design or a new danger) from among the input image data D1 by using the neural network NN. The extracted image data D2 having a feature is transmitted to and stored in the DB 4 via the network 5.

This enables the learning apparatus 3 to learn the image data D2 having a feature, and to generate a neural network NN structure that can handle new automobile designs and new dangers. This also enables the PLD 2a to correctly recognize and judge a new automobile design or a new danger when a new automobile design or a new danger appears. In other words, the PLD 2a is capable of efficiently collecting learning data of the usage environment, and performing recognition processing, for example, in accordance with the usage environment that changes day by day.

The PLD 2a is configured to extract the image data D2 having a feature to transmit the extracted image data D2 having a feature to the network 5. Specifically, it is not necessary for the vehicle 1 to transmit all of the photographed image data to the network 5. As a result, the storage capacity of the DB 4 may be saved, and the load on the network 5 may be reduced.

In the example described above, the learning apparatus 3 periodically updates the image data in the DB 4. However, the learning apparatus 3 may learn the image data in the DB 4 during a program update of the ECU 2 performed by an automobile manufacturer, for example. The automobile manufacturer may transmit the structure of the neural network NN of the PLD 2a learned and generated by the learning apparatus 3 to the ECU 2 together with the update program of the ECU 2.

In FIG. 1, the learning apparatus 3 and the DB 4 are separate apparatus, but the learning apparatus 3 and the DB 4 may be configured as a single apparatus.

In FIG. 1, only one vehicle is illustrated, but a plurality of vehicles may be present.

The learning apparatus 3 and the DB 4 may be hereinafter referred to as a "host system".

Figure 2:
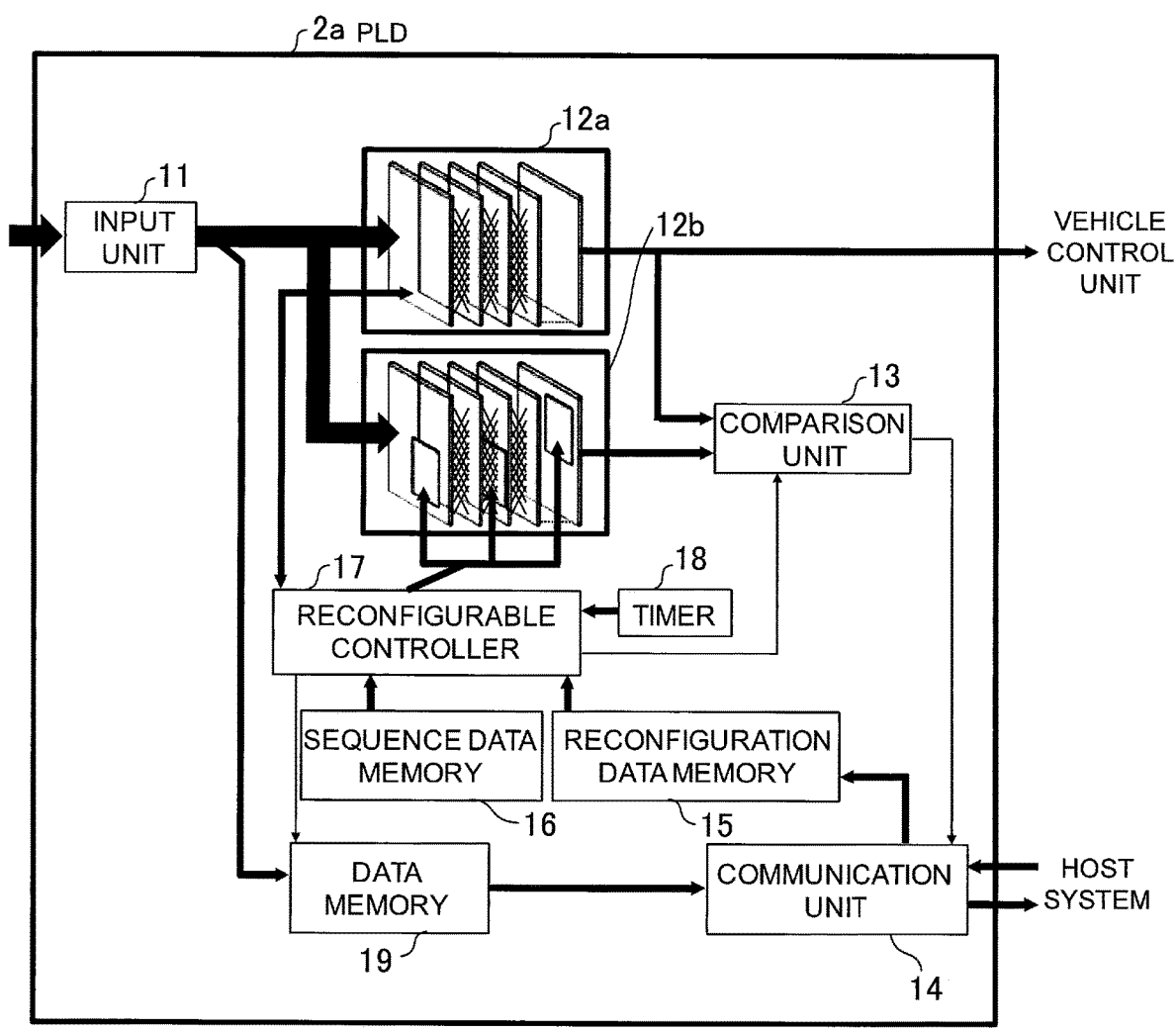
FIG. 2 is a diagram for illustrating a block configuration example of the PLD of FIG. 1.

FIG. 2 is a diagram for illustrating a block configuration example of the PLD 2a of FIG. 1. As illustrated in FIG. 2, the PLD 2a includes an input unit 11, neural networks 12a and 12b, a comparison unit 13, a communication unit 14, a reconfiguration data memory 15, a sequence data memory 16, a reconfigurable controller 17, a timer 18, and a data memory 19.

A camera is mounted to the vehicle 1 illustrated in FIG. 1. The camera mounted to the vehicle 1 is configured to photograph, for example, the surroundings of the vehicle 1. Image data output from the camera mounted to the vehicle 1 is input to the input unit 11.

The neural networks 12a and 12b correspond to the neural network NN illustrated in FIG. 1. The image data input to the input unit 11 is input to each of the neural networks 12a and 12b. The neural networks 12a and 12b are configured to recognize and judge the input image data.

A part of the structure of the neural network 12b is different from the structure of the neural network 12a. For example, the square hatched portions of the neural network 12b illustrated in FIG. 2 represent portions having a different structure from the neural network 12a. The structures of the neural networks 12a and 12b are transmitted from the host system. For example, as described with reference to FIG. 1, the structures of the neural networks 12a and 12b are generated based on the learning by the learning apparatus 3, and are periodically transmitted to the PLD 2a.

An output result (i.e., output value) of the neural network 12a is output to the comparison unit 13 and a vehicle control unit. The vehicle control unit is configured to perform predetermined vehicle control (e.g., braking control or steering wheel control of the vehicle 1) based on the output result of the neural network 12a.

An output result of the neural network 12b is output to the comparison unit 13. The neural network 12b is a neural network for extracting image data having a feature from the image data input to the input unit 11. The image data having a feature may be hereinafter referred to as "feature image data".

The comparison unit 13 is configured to compare the output result of the neural network 12a and the output result of the neural network 12b. The comparison unit 13 outputs, when the output result of the neural network 12a and the output result of the neural network 12b are different from each other by a predetermined standard or more (i.e., predetermined threshold or more), a feature detection signal to the communication unit 14. For example, the comparison unit 13 outputs the feature detection signal to the communication unit 14 when a degree of similarity between the output result of the neural network 12a and the output result of the neural network 12b is different by a predetermined amount or more.

The communication unit 14 is configured to access the network 5, which may be the Internet, for example, via wireless communication to communicate to/from the host system connected to the network 5. The communication unit 14 outputs to the reconfigurable controller 17 the structure of the neural network 12a transmitted from the host system. The communication unit 14 also transmits to the reconfiguration data memory 15 the structure of the neural network 12b transmitted from the host system. The host system is configured to transmit a plurality of structures (i.e., plurality of patterns) of the neural network 12b. This point is described later.

The communication unit 14 transmits, when the feature detection signal has been output from the comparison unit 13, the image data stored in the data memory 19 to the host system. Specifically, the communication unit 14 transmits, when it is judged by the comparison unit 13 that the image data input to the input unit 11 is feature image data, the image data input to the input unit 11 (i.e., image data stored in the data memory 19) to the host system. As a result, the host system can perform learning in accordance with the usage environment of the vehicle 1.

The structures of the neural network 12b received by the communication unit 14 from the host system are stored in the reconfiguration data memory 15. As described above, there are a plurality of structures of the neural network 12b transmitted from the host system.

Figure 3:
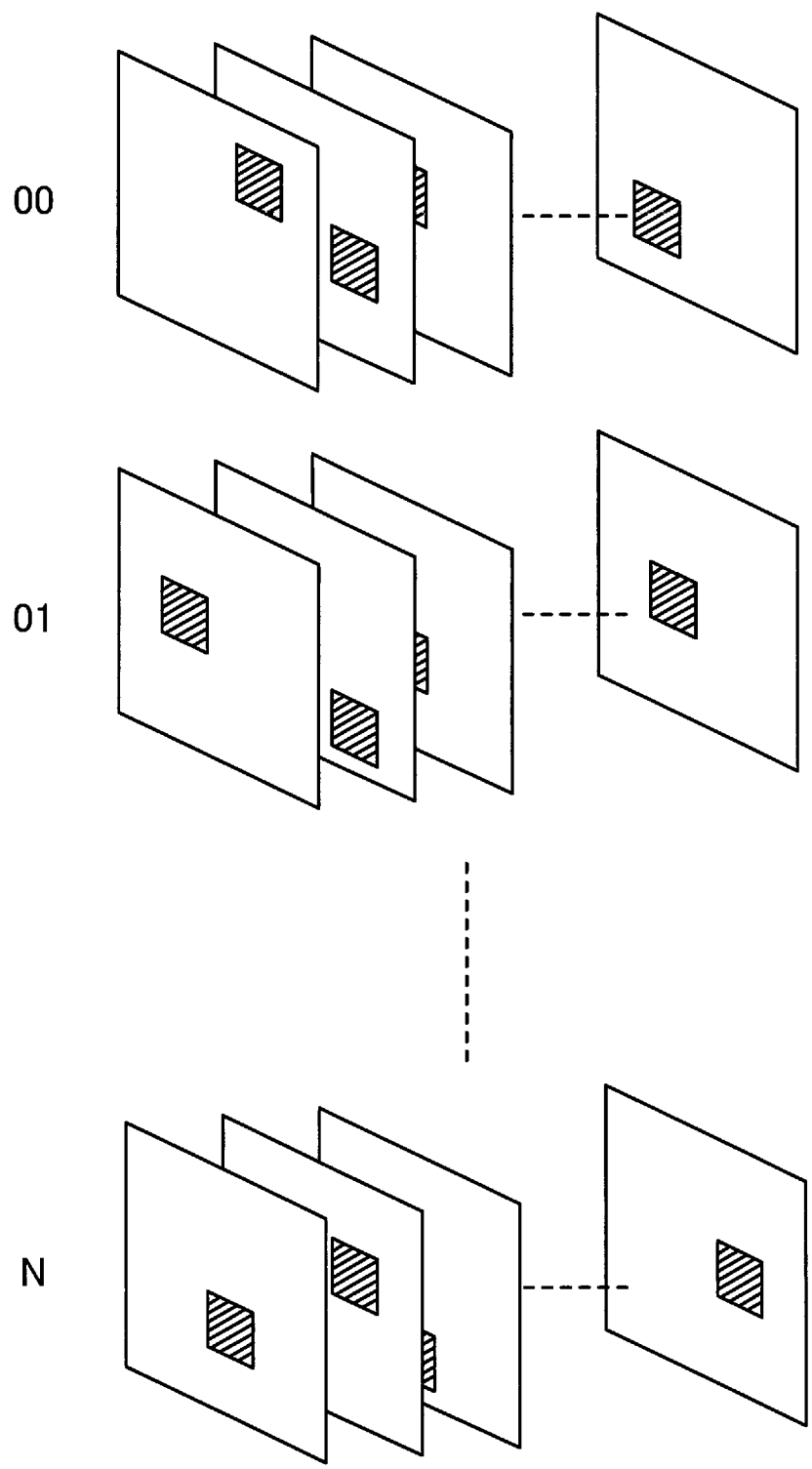
FIG. 3 is a diagram for illustrating an example of a neural network structure stored in a reconfiguration data memory.

FIG. 3 is a diagram for illustrating an example of the structures of the neural network 12b stored in the reconfiguration data memory 15. The reference symbols "00", "01" . . . "N" in FIG. 3 denote identifiers for identifying each structure of the neural network 12b. The identifiers are transmitted from the host system together with the structures of the neural network 12b.

The hatched portions in FIG. 3 represent portions that are different from the structure of the neural network 12a. In each layer, a part (i.e., the hatched portion) of the structures of the neural network 12b is different from that of the neural network 12a. From the host system, (N+1) different structures (i.e., information on the structures) of the neural network 12b are transmitted, and stored in the reconfiguration data memory 15.

It is not necessary for all of the structures of the neural network 12b to be stored in the reconfiguration data memory 15. For example, only the parts that are different from those of the structure of the neural network 12a (i.e., only the hatched portions) may be stored in the reconfiguration data memory 15.

Returning to the description of FIG. 2, a sequence that the reconfigurable controller 17 uses to refer to the structures of the neural network 12b stored in the reconfiguration data memory 15 is stored in the sequence data memory 16. For example, the neural network 12b identifiers are stored in the sequence data memory 16.

Figure 4:
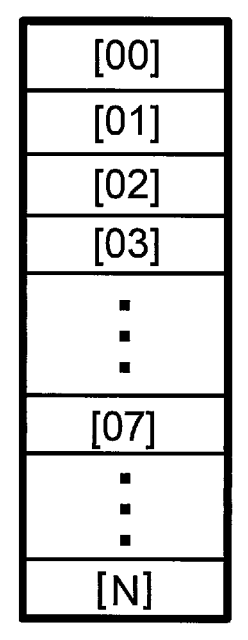

FIG. 4 is a table for showing a data configuration example of the sequence data memory 16. The reference symbols "00", "01" . . . "N" in FIG. 4 correspond to the neural network 12b identifiers.

Returning to the description of FIG. 2, the reconfigurable controller 17 forms the neural network 12a based on the structure of the neural network 12a received by the communication unit 14.

There configurable controller 17 refers to the reconfiguration data memory 15 to form the neural network 12b in accordance with the sequence stored in the sequence data memory 16. The reconfigurable controller 17 also refers to the reconfiguration data memory 15 to form the neural network 12b in accordance with a periodic instruction from the timer 18.

For example, in the case of the sequence example shown in FIG. 4, the reconfigurable controller 17 forms the neural network 12b having the structure with the identifier "00" in accordance with an instruction from the timer 18 (i.e., refers to the neural network corresponding to "00" of FIG. 3). The reconfigurable controller 17 forms, when a next instruction from the timer 18 is received, the neural network 12b having the structure with the identifier "01" (i.e., refers to the neural network corresponding to "01" of FIG. 3). In the same manner, the reconfigurable controller 17 subsequently forms the neural network 12b having the structure with the identifier "N" in accordance with an instruction from the timer 18 (i.e., refers to the neural network corresponding to "N" of FIG. 3). The reconfigurable controller 17 also forms, when the neural network 12b having the structure with the identifier "N" has been formed, the neural network 12b having the structure with the identifier "00".

The image data input to the input unit 11 is temporarily stored in the data memory 19. The communication unit 14 transmits the image data stored in the data memory 19 to the host system in accordance with the feature detection signal from the comparison unit 13.

In this way, the structures of the neural network 12b formed in the PLD 2a are changed in accordance with a period of the timer 18. Specifically, the comparison unit 13 compares the output result of the neural network 12a and the output result of the neural network 12b, in which a part of the structures is periodically changed. As a result, the PLD 2a can extract various feature image data, and transmit the extracted feature image data to the host system.

The host system can learn the new image data extracted by the PLD 2a to generate the neural networks 12a and 12b based on the new learning. The PLD 2a is capable of responding to various environments by receiving the neural networks 12a and 12b that are based on the new learning.

Figure 5:
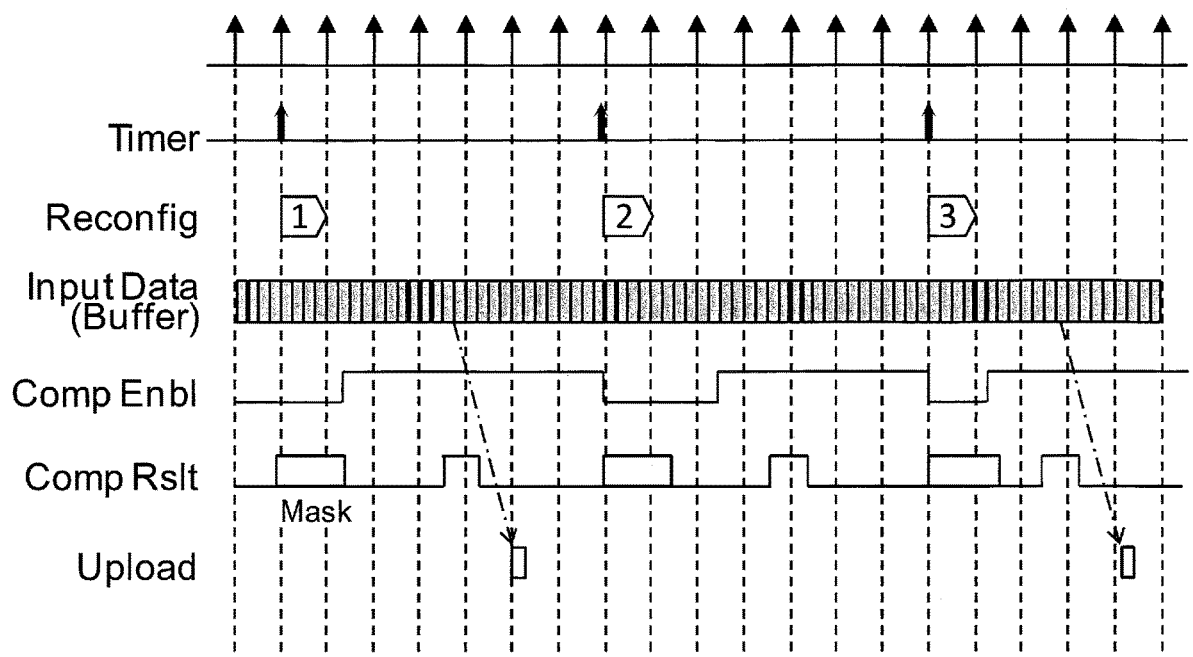
FIG. 5 is a timing chart for illustrating an operation example of the PLD.

FIG. 5 is a timing chart for illustrating an operation example of the PLD 2a. In this example, the communication unit 14 has received the structure of the neural network 12a and the plurality of structures of the neural network 12b from the host system, and has stored the plurality of structures of the neural network 12b received from the host system in the reconfiguration data memory 15, as illustrated in FIG. 3. The reconfigurable controller 17 has also formed the neural network 12a based on the structure of the neural network 12a received by the communication unit 14.

The reference symbol "Clk" in FIG. 5 represents a reference clock operated by the PLD 2a.

The reference symbol "Timer" represents a timing at which the timer 18 outputs a timer signal to the reconfigurable controller 17. More specifically, the reconfigurable controller 17 refers to the reconfiguration data memory 15 at the timing indicated by the "Timer" of FIG. 5 to form the neural network 12b. The reconfigurable controller 17 refers to the reconfiguration data memory 15 illustrated in FIG. 3 in a sequence order (identifier order) of the sequence data memory 16 shown in FIG. 4.

The reference symbol "Reconfig" represents the neural network 12b to be formed in the PLD 2a. In the example of FIG. 5, there is illustrated a case in which, first, the neural network 12b having the identifier "00" is formed at the timing indicated by the initial "Timer". Then, in the case illustrated in FIG. 5, at the next "Timer" timing, the neural network 12b having the identifier "01" is formed, and at the next "Timer" timing, the neural network 12b having the identifier "02" is formed.

The reference symbol "Input Data (Buffer)" represents the timing at which the data memory 19 stores the image data to be input to the input unit 11.

The reference symbol "Comp Enbl" represents the timing at which the comparison unit 13 compares the output result of the neural network 12a and the output result of the neural network 12b. In the example of FIG. 5, the comparison unit 13 compares the output result of the neural network 12a and the output result of the neural network 12b when "Comp Enbl" is in an H-state.

The reference symbol "Comp Enbl" is in an L-state at least during the period in which the neural network 12b is reconfigured. Specifically, the comparison unit 13 is configured to not compare the output result of the neural network 12a and the output result of the neural network 12b during the period in which the neural network 12b is reconfigured.

The reference symbol "Comp Rslt" represents the feature detection signal to be output to the communication unit 14 from the comparison unit 13. The feature detection signal is, as indicated by the reference symbol "Mask" of FIG. 5, masked during the period in which the neural network 12b is reconfigured so that the feature detection signal is not output to the communication unit 14.

The reference symbol "Upload" represents the timing at which the image data stored in the data memory 19 is to be transmitted by the communication unit 14 to the host system. The communication unit 14 extracts, when the feature detection signal (Comp Rslt) has become active (i.e., has been output from the comparison unit 13), the original image data outputting the feature detection signal from the data memory 19, and transmits the extracted image data to the host system.

Figure 6:
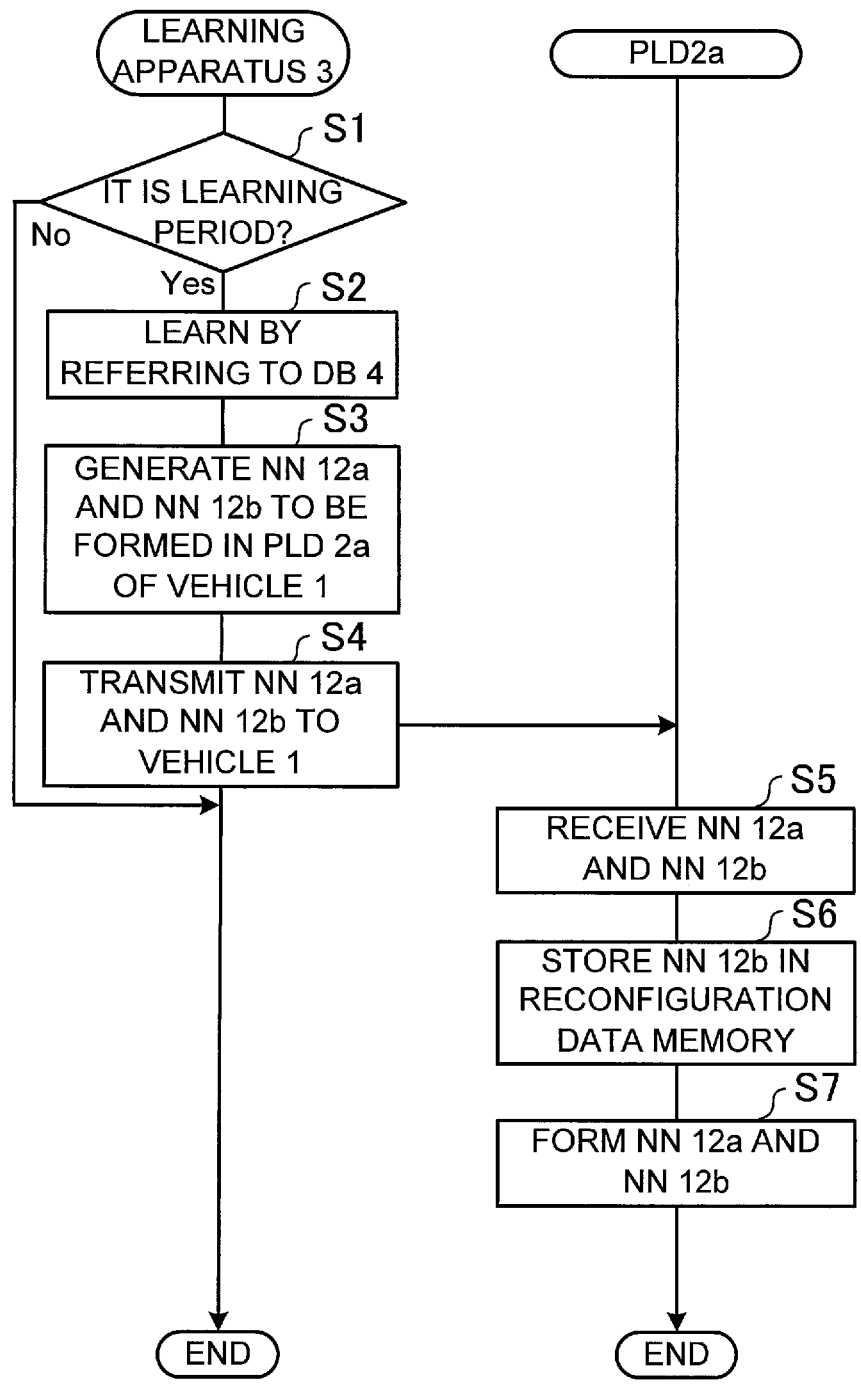
FIG. 6 is a sequence diagram for illustrating a change processing example of neural networks.

FIG. 6 is a sequence diagram for illustrating a change processing example of the neural networks 12a and 12b. In FIG. 6, a sequence example of the learning apparatus 3 and the PLD 2a is illustrated. The learning apparatus 3 is configured to repeatedly execute the sequence illustrated in FIG. 6 at a period that is at least shorter than a learning period of Step S1, for example. The learning period is, for example, one week.

First, the learning apparatus 3 judges whether or not it is the learning period (Step S1). When it is judged that it is not the learning period ("No" in S1), the learning apparatus 3 ends the processing of this sequence.

On the other hand, when it is judged that it is the learning period ("Yes" in S1), the learning apparatus 3 refers to the DB 4, and learns the image data stored in the DB 4 (Step S2). The image data stored in the DB 4 is, for example, as described with reference to FIG. 1, image data of a road, image data of a vehicle, for example, an automobile, a motorbike, or a bicycle, and image data of a road sign, for example. The learning apparatus 3 learns, for example, the dangers to the vehicle 1 based on the image data.

The learning apparatus 3 generates the structures of the neural networks 12a and 12b to be formed in the PLD 2a of the vehicle 1 based on the learning performed in Step S2 (Step S3).

For example, the learning apparatus 3 generates the structure of the neural network 12a for the PLD 2a to recognize a danger to the vehicle 1. The learning apparatus 3 also generates, for example, the structures of the neural network 12b for the PLD 2a to extract the feature image data. As described above, a plurality of structures of the neural network 12b are generated in order to allow various feature image data to be extracted (e.g., refer to FIG. 3).

The learning apparatus 3 transmits the structures of the neural networks 12a and 12b generated in Step S3 to the vehicle 1 (Step S4).

The communication unit 14 of the PLD 2a receives the structures of the neural networks 12a and 12b transmitted in Step S4 (Step S5).

The communication unit 14 of the PLD 2a stores the structures of the neural network 12b received in Step S5 in the reconfiguration data memory 15 (Step S6). As a result, as illustrated in FIG. 3, a plurality of different structures of the neural network 12b are stored in the reconfiguration data memory 15.

The reconfigurable controller 17 of the PLD 2a forms the neural networks 12a and 12b having the structures of the neural networks 12a and 12b received in Step S5 (Step S7). The reconfigurable controller 17 forms the neural network 12b in accordance with the first sequence of the sequences stored in the sequence data memory 16. For example, in the case of the example of FIG. 5, the reconfigurable controller 17 is configured to form the neural network 12b having the identifier "00".

Based on the processing sequence described above, in the PLD 2a, neural networks 12a and 12b based on the newest learning are formed every learning period.

Figure 7:
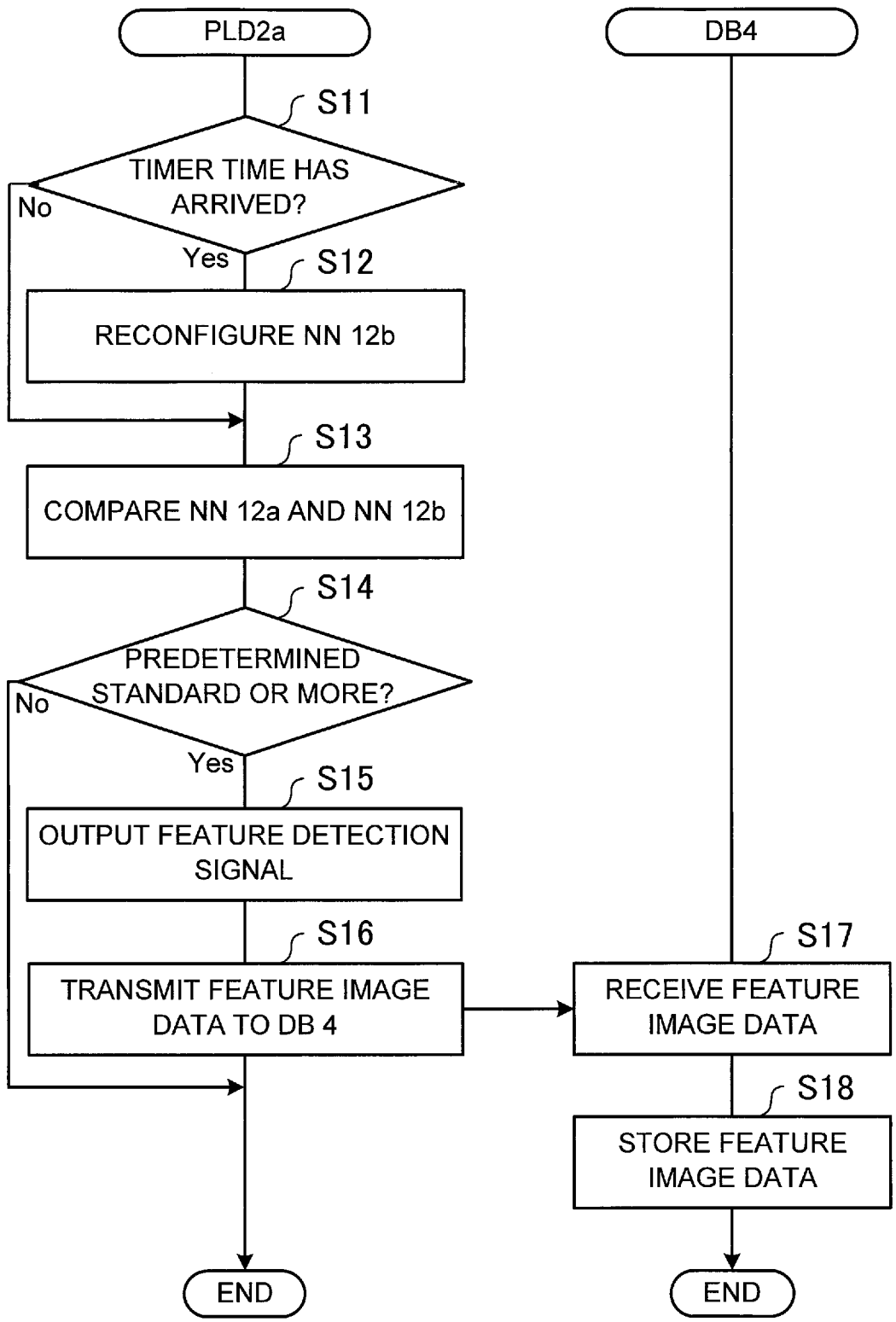
FIG. 7 is a sequence diagram for illustrating a processing example of formation of a neural network and extraction of feature image data.

FIG. 7 is a sequence diagram for illustrating a processing example of formation of the neural network 12b and extraction of the feature image data. In FIG. 7, there is illustrated a sequence example of the PLD 2a and the DB 4. The PLD 2a repeatedly executes the sequence illustrated in FIG. 7 at a period in which the image data is to be input to the input unit 11 (refer to the "Input Data Buffer" of FIG. 5), for example.

First, the PLD 2a (i.e., the timer 18) judges whether or not the timer time (refer to "Timer" of FIG. 5) has arrived (Step S11). When it is judged by the timer 18 that the timer time has not arrived ("No" in Step S11), the PLD 2a advances the processing to Step S13.

On the other hand, when it is judged by the timer 18 that the timer time has arrived ("Yes" in Step S11), based on the sequence stored in the sequence data memory 16, the reconfigurable controller 17 of the PLD 2a refers to the reconfiguration data memory 15 to form the neural network 12b (refer to "Reconfig" of FIG. 5) (Step S12). As a result, at every timer time, a neural network 12b having the structures with the identifiers "00" to "N" illustrated in FIG. 3, for example, is repeatedly formed in order.

The comparison unit 13 of the PLD 2a compares the output result of the neural network 12a and the output result of the neural network 12b (Step S13).

The comparison unit 13 of the PLD 2a judges whether or not the comparison result between the output result of the neural network 12a and the output result of the neural network 12b is different by a predetermined standard or more (Step S14). When the comparison result between the output result of the neural network 12a and the output result of the neural network 12b is not different by the predetermined standard or more ("No" in S14), the comparison unit 13 ends the processing of this sequence.

On the other hand, when the comparison result between the output result of the neural network 12a and the output result of the neural network 12b is different by the predetermined standard or more ("Yes" in S14), the comparison unit 13 outputs the feature detection signal to the communication unit 14 (Step S15).

The communication unit 14 of the PLD 2a transmits the image data (i.e., feature image data) stored in the data memory 19 to the DB 4 based on the feature detection signal output in Step S15 (Step S16).

The DB 4 receives the feature image data transmitted in Step S16 (Step S17), and then stores the feature image data received in Step S17 (Step S18).

Based on the sequence described above, a neural network 12b having different structures is formed in the PLD 2a at every timer time. When image data having a feature has been input to the input unit 11, that image data is transmitted to and stored in the DB 4 as feature image data. As a result, the learning apparatus 3 can learn based on learning data including new learning data (i.e., the feature image data).

Figure 8:
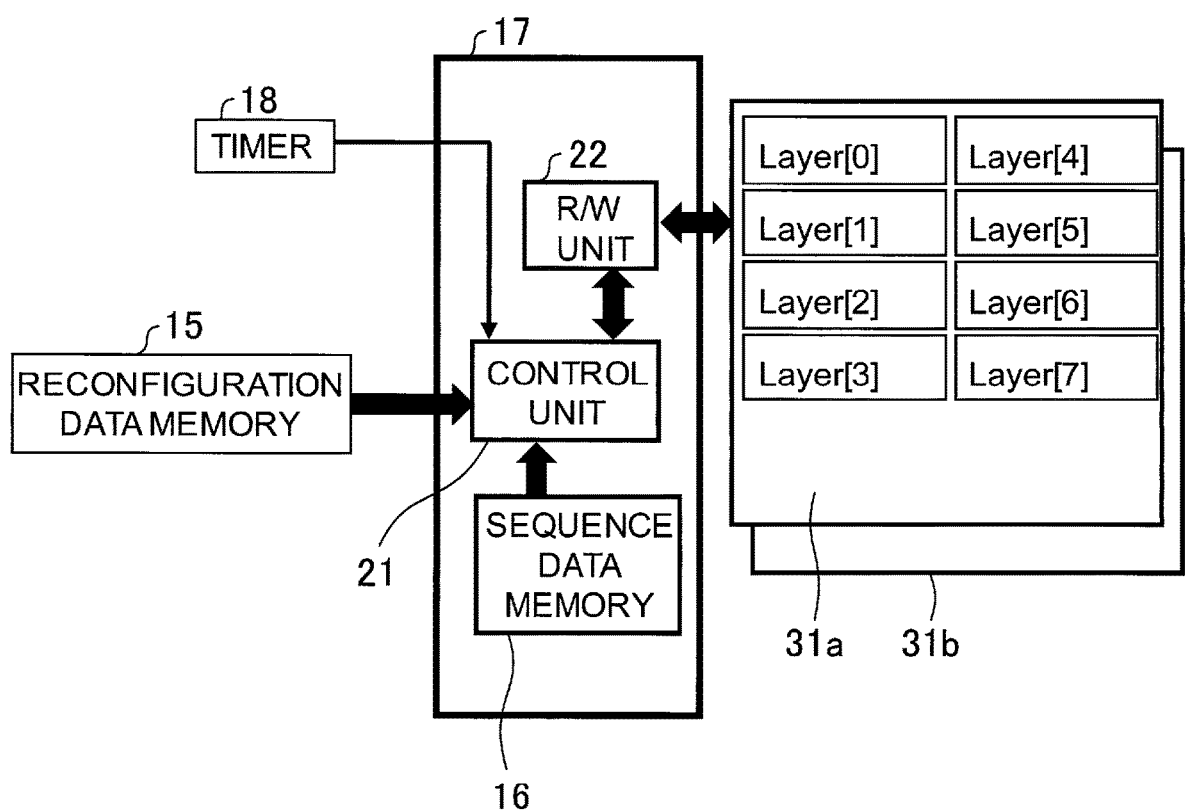
FIG. 8 is a diagram for illustrating a block configuration example of a reconfigurable controller.

FIG. 8 is a diagram for illustrating a block configuration example of the reconfigurable controller 17. In FIG. 8, like parts to those of FIG. 2 are denoted by like reference symbols. In FIG. 8, there are illustrated, in addition to the reconfigurable controller 17, the reconfiguration data memory 15 and the timer 18 illustrated in FIG. 2. There is also illustrated in FIG. 8, in addition to the reconfigurable controller 17, neural network areas 31a and 31b formed by the neural networks 12a and 12b. In FIG. 8, the reconfigurable controller 17 includes the sequence data memory 16, but as illustrated in FIG. 2, the sequence data memory 16 may be formed outside of the reconfigurable controller 17. The reconfiguration data memory 15 may also be formed inside the reconfigurable controller 17.

The reconfigurable controller 17 includes a control unit 21 and a read/write (R/W) unit 22. When a power supply is input, for example, the control unit 21 initially configures the PLD 2a by referring to data for initial configuration stored in the reconfiguration data memory 15, which is a nonvolatile memory.

Next, the control unit 21 refers to the reconfiguration data memory 15, and sequentially controls reconfiguration of each of the neural network areas 31a and 31b via the R/W unit 22. The control unit 21 controls reconfiguration in accordance with the sequence in the sequence data memory 16. In the sequence data memory 16, the data for initial configuration and the data for performing reconfiguration (e.g., structures of the neural network 12b) by time sharing are stored separately.

The neural network areas 31a and 31b are a configuration random access memory (CRAM) or other such configuration memory. The neural network 12a is formed in, for example, the neural network area 31a, and the neural network 12b is formed in, for example, the neural network area 31b. In FIG. 8, there is illustrated an example in which an 8-layer (i.e., layer 0 to layer 7) neural network 12a is formed in the neural network area 31a.

Figure 9:
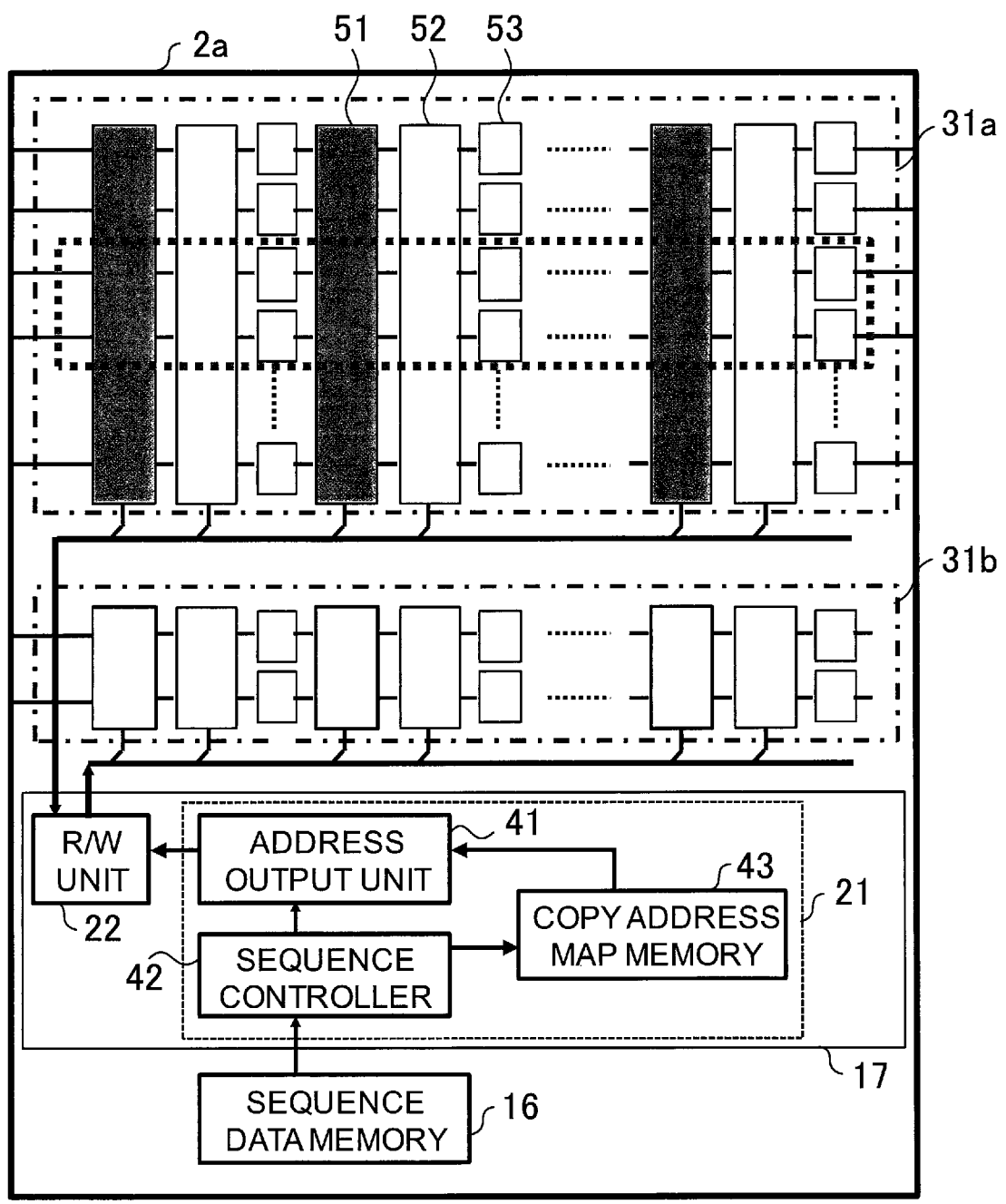
FIG. 9 is a diagram for illustrating a hardware configuration example of the PLD.

FIG. 9 is a diagram for illustrating a hardware configuration example of the PLD 2a. In FIG. 9, like parts to those of FIGS. 2 and 8 are denoted by like reference symbols. In FIG. 9, the hardware of the input unit 11, the comparison unit 13, the communication unit 14, the reconfiguration data memory 15, the timer 18, and the data memory 19 illustrated in FIG. 2 are omitted. In FIG. 9, unlike in FIG. 8, the sequence data memory 16 is formed outside of the reconfigurable controller 17.

The neural network area 31a illustrated in FIG. 9, which is formed, for example, by a CRAM, is formed by the neural network 12a configured to recognize and judge input image data. The neural network area 31b, which is formed, for example, by a CRAM, is formed by the neural network 12b for extracting feature image data from input image data.

The neural network area 31a includes a storage area 51 configured to store a weighting coefficient, a storage area 52 configured to store information on connection relations among, for example, the layers of the neural network 12a, and a calculation area 53 configured to perform calculations. The neural network area 31b also includes similar storage areas and a similar calculation area.

The R/W unit 22 is configured to read data from and write data to the CRAM. An address output unit 41 is configured to output a physical address of the CRAM. A sequence controller 42 is configured to control the address output unit 41 and a copy address map memory 43 in accordance with the sequence in the sequence data memory 16. The copy address map memory 43 is a memory configured to store a correspondence relation between the physical addresses of the neural network areas 31a and 31b.

The control unit 21 also stores, in order to change a connection relation with the weighting coefficient of the neural network 12b by time sharing, a weighting coefficient in a CRAM configured to store logic information. The neural network area 31b in which the neural network 12b is formed is rewritten at a timer time interval of the timer 18. As a result, the neural network area 31b in the CRAM is autonomously rewritten by time sharing.

A related-art neural network weighting coefficient is stored in a random-access memory (RAM) block, and R/W is performed every word. However, it is difficult to simultaneously execute a plurality of data sharing operations to computing units formed in parallel, which is a characteristic of FPGA. In the PLD 2a, the weighting coefficient is stored in a CRAM, which enables a weighting coefficient value to be supplied simultaneously to a plurality of computing units. Further, with a RAM block, it is difficult to read the weighting coefficient because the read port is being used when copy processing of the neural networks is executed. However, with the PLD 2a, a configuration bus that is independent of the read path during calculations can be used for updating via the R/W unit 22, without stopping the calculation processing. In addition, because the RAM blocks are grouped and fixed due to the physical arrangement of the FPGA, depending on the arrangement position, a wiring delay is increased when the neural network structures are changed. However, with the PLD 2a, because the networks and the weighting coefficients are implemented in a configuration memory, the arrangement can be closer, which allows the wiring delay to be decreased. As a result, a new memory and logic circuit for rewriting as described above are not needed, which enables implementation in a small-scale FPGA.

As described above, the PLD 2a includes the neural network 12a that image data is input to, the neural network 12b that image data is input to, and has a different structure from that of the neural network 12a, and the comparison unit 13, which is configured to compare an output result of the neural network 12a and an output result of the neural network 12b. The PLD 2a also includes the communication unit 14, which is configured to wirelessly transmit image data when the output result of the neural network 12a and the output result of the neural network 12b are different from each other by a predetermined standard or more to the host system configured to learn image data. As a result, the PLD 2a can efficiently collect image data of the usage environment.

Because the PLD 2a is configured to efficiently collect image data of the usage environment, the host system can generate the neural networks 12a and 12b in accordance with the usage environment, which changes day by day. The PLD 2a can also perform appropriate recognition processing, for example, by using, in accordance with the usage environment which changes day by day, the neural networks 12a and 12b generated by the host system.

The PLD 2a is configured to not transmit all of the image data photographed by the camera to the network 5 as learning data. This enables the storage capacity of the DB 4 to be reduced, and the load on the network 5 to be suppressed.

The PLD 2a forms, at a predetermined period, the neural network 12b having a plurality of different structures. This enables the PLD 2a to extract various kinds of feature image data.

As a result of using a programmable logic device and implementing the neural network structures on a configuration memory, high performance can be achieved at a smaller scale and using less power.

Because the PLD 2a includes the two neural networks 12a and 12b, image data of the usage environment can be collected without placing a burden on recognition processing, for example.

Second Embodiment

In a second embodiment of the present invention, the structures of the neural network 12b are different from those in the first embodiment. In the first embodiment, a part of the structure of each layer of the neural network 12b (refer to FIG. 3) is different from that of the neural network 12a, but in the second embodiment, a part in the layer direction of the structures is different from that of the neural network 12a.

Figure 10:
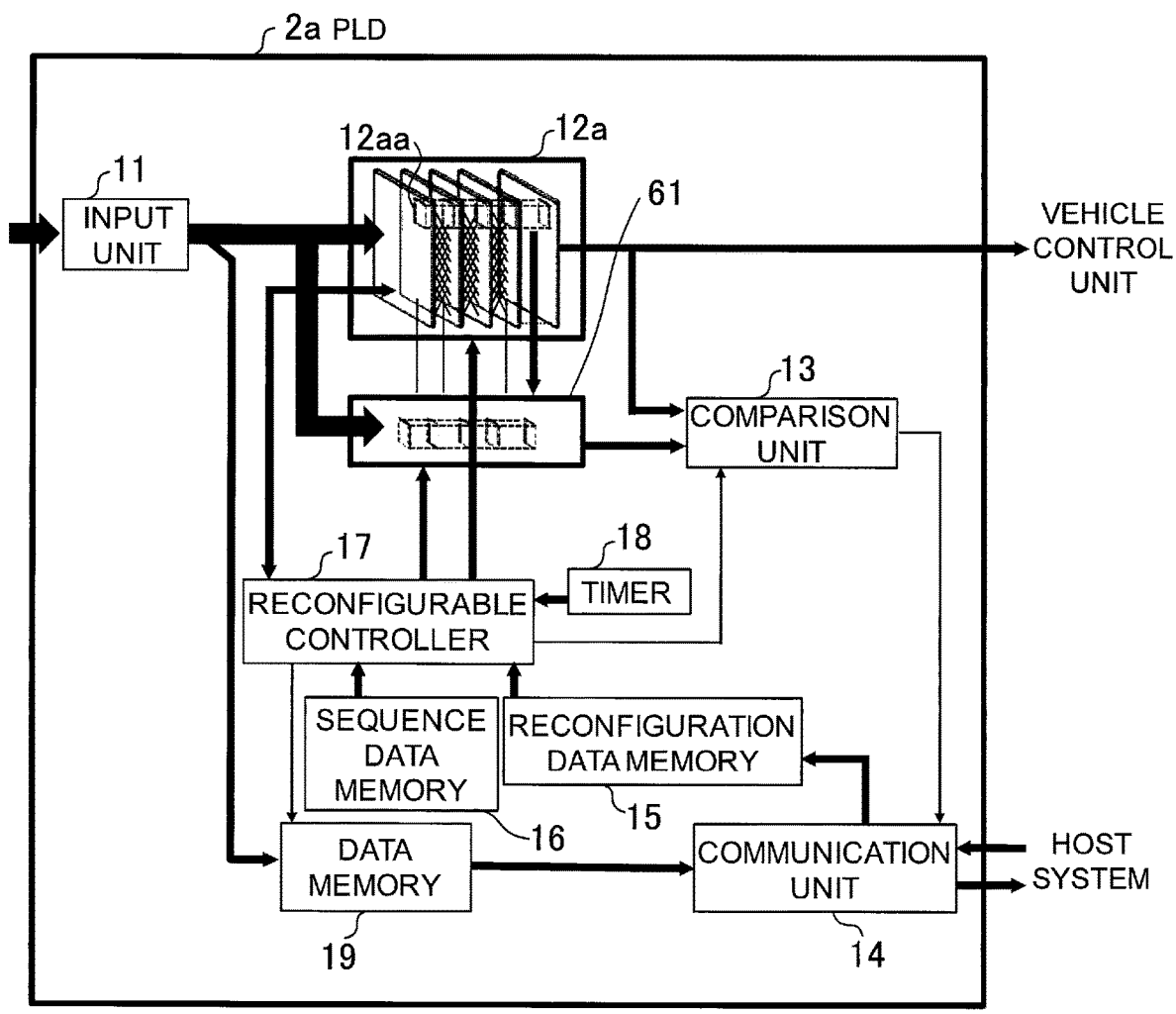
FIG. 10 is a diagram for illustrating a block configuration example of the PLD of a second embodiment of the present invention.

FIG. 10 is a diagram for illustrating a block configuration example of the PLD 2a of the second embodiment. In FIG. 10, like parts to those of FIG. 2 are denoted by like reference symbols. A description is now provided of parts that are different from FIG. 2.

A part of the structure of a neural network 61 illustrated in FIG. 10 is different from the structure of the neural network 12a. For example, a part in the layer direction of the structure of the neural network 61 is different from that of the neural network 12a. More specifically, in the neural network 61, a layer direction portion 12aa of the neural network 12a has a structure different from that of the neural network 12a.

The portions of the neural network 12b that are not different from those of the neural network 12a are not illustrated in FIG. 10. However, the portions that are not shown have the same structure as that of the neural network 12a. Specifically, the only portion of the neural network 12b that is different from the neural network 12a is the layer direction portion 12aa.

The neural network 61 has a plurality of structures. The plurality of structures of the neural network 61 are stored in the reconfiguration data memory 15.

FIG. 11 is a diagram for illustrating an example of the structures of the neural network 61 stored in the reconfiguration data memory 15. The reference symbols "00", "01" . . . "N" in FIG. 11 represent identifiers for identifying each structure of the neural network 61.

The dotted line portion in FIG. 11 represents the structure portion that is different from that of the neural network 12a. The plurality of structures of the neural network 61 having the identifiers "00" to "N", like those illustrated in FIG. 11, for example, are stored in the reconfiguration data memory 15.

Only the portion that is different from that of the neural network 12a is stored in the reconfiguration data memory 15. In other words, only the structures of the dotted-line portion illustrated in FIG. 11 are stored in the reconfiguration data memory 15. The reconfigurable controller 17 illustrated in FIG. 10 is configured to form the neural network 61 by copying the structures other than the dotted-line portion from the neural network 12a.

As described above, a part in the layer direction of the structures of the neural network 61 is different from that of the neural network 12a. Therefore, the PLD 2a can efficiently collect image data of the usage environment.

In the example described above, only the structure portion different from that of the neural network 12a is stored in the reconfiguration data memory 15. However, the structure portions that are the same as those of the neural network 12a may also be stored. For example, the structures other than the dotted-line portion illustrated in FIG. 11 may be stored in the reconfiguration data memory 15.

Third Embodiment

In a third embodiment of the present invention, a whole layer of the structures of the neural network 12b is different from that of the neural network 12a.

Figure 12:
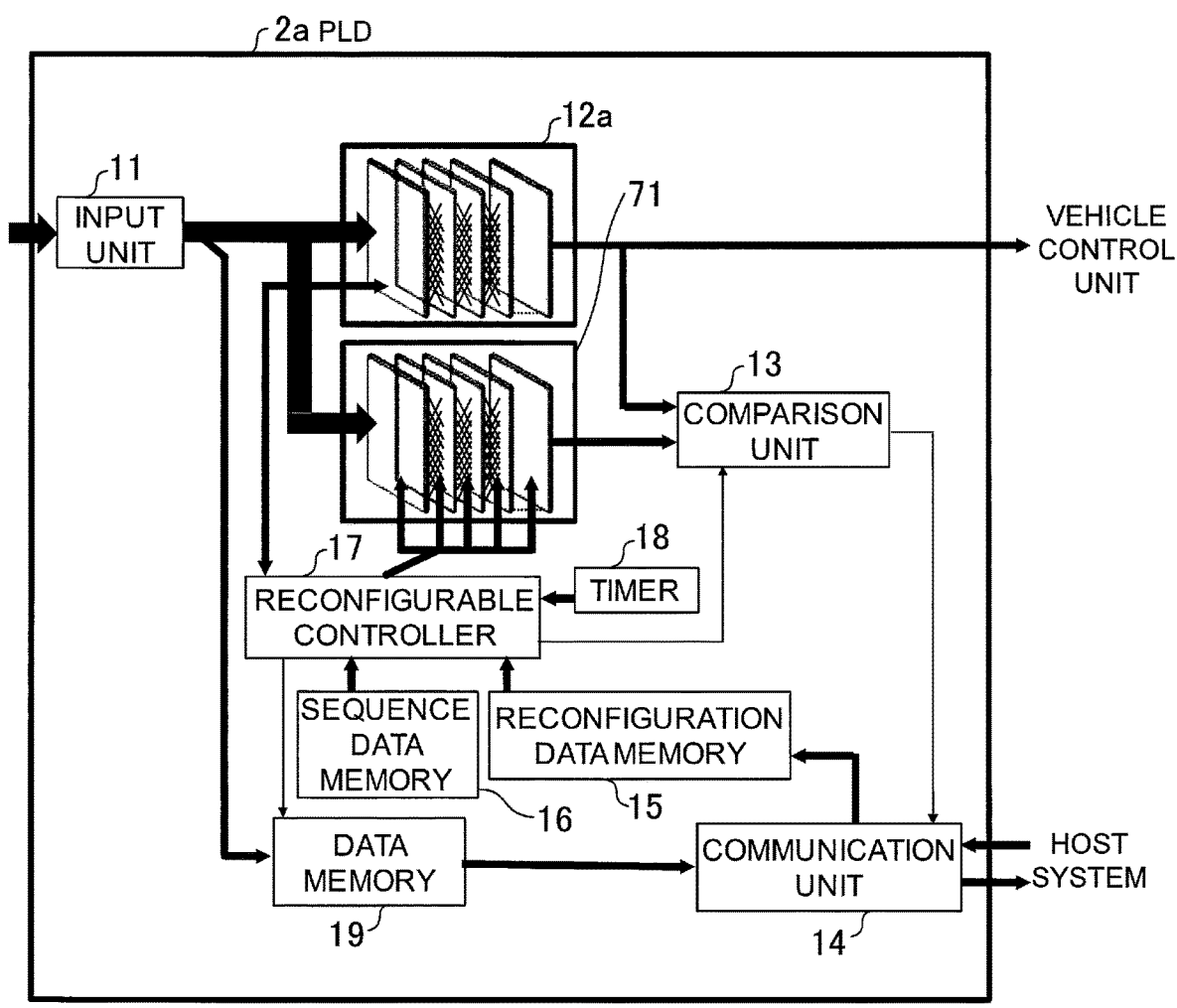
FIG. 12 is a diagram for illustrating a block configuration example of the PLD of a third embodiment of the present invention.

FIG. 12 is a diagram for illustrating a block configuration example of the PLD 2a of the third embodiment. In FIG. 12, like parts to those of FIG. 2 are denoted by like reference symbols. A description is now provided of parts that are different from FIG. 2.

A part of the structure of a neural network 71 illustrated in FIG. 12 is different from the structure of the neural network 12a. For example, one layer of the structure of the neural network 71 is different from that of the neural network 12a.

The neural network 71 has a plurality of structures. The plurality of structures of the neural network 71 are stored in the reconfiguration data memory 15.

FIG. 13 is a diagram for illustrating an example of the structures of the neural network 71 stored in the reconfiguration data memory 15. The reference symbols "00", "01" . . . "N" in FIG. 13 represent identifiers for identifying each structure of the neural network 71.

The hatched layers illustrated in FIG. 13 represent layers having a different structure from the neural network 12a. For example, in the neural network 71 having the identifier "00", the first layer has a different structure from the neural network 12a. For example, in the neural network 71 having the identifier "01", the second layer has a different structure from the neural network 12a. The plurality of structures of the neural network 71 having the identifiers "00" to "N", like those illustrated in FIG. 13, for example, are stored in the reconfiguration data memory 15.

Only the portion that is different from the neural network 12a is stored in the reconfiguration data memory 15. In other words, only the structures of the hatched portion illustrated in FIG. 11 are stored in the reconfiguration data memory 15. The reconfigurable controller 17 illustrated in FIG. 12 forms the neural network 71 by copying the structures other than the hatched portion from the neural network 12a.

In the neural network 71 described above, the structure of one layer is different from that of the neural network 12a. However, the structures of two or more layers may be different.

As described above, at least an entire layer of the structures of the neural network 71 is different from that of the neural network 12a. Therefore, the PLD 2a can efficiently collect image data of the usage environment.

In the example described above, only the layer different in structure from the neural network 12a is stored in the reconfiguration data memory 15. However, the layers having the same structure as that of the neural network 12a may also be stored. For example, the structures of layers other than the hatched portion illustrated in FIG. 13 may be stored in the reconfiguration data memory 15.

Fourth Embodiment

In the first to third embodiments, a part of the structures of the neural network 12b is different from that of the neural network 12a. In a fourth embodiment of the present invention, all of the structures of the neural network 12b are different from those of the neural network 12a.

Figure 14:
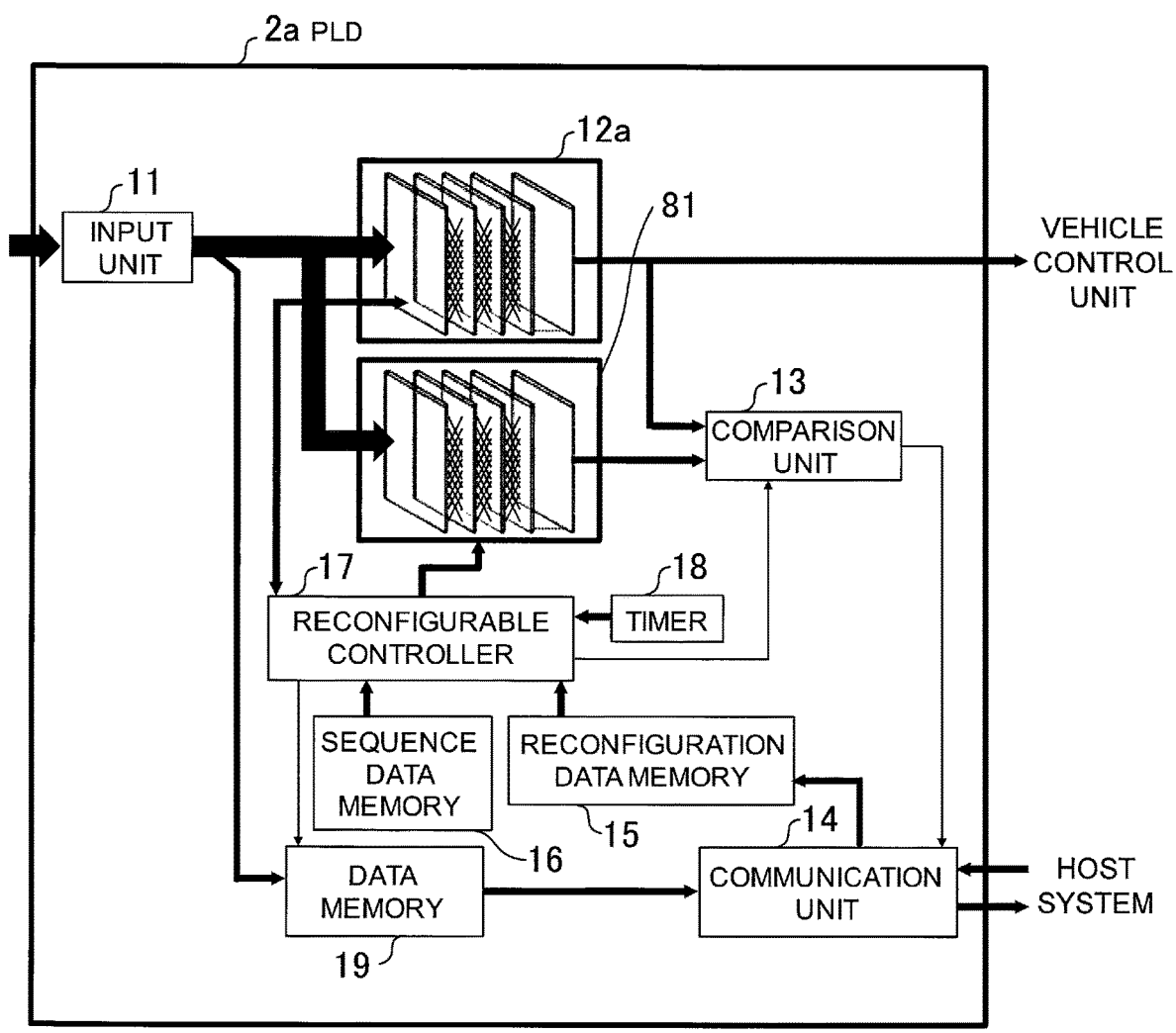
FIG. 14 is a diagram for illustrating a block configuration example of the PLD of a fourth embodiment of the present invention.

FIG. 14 is a diagram for illustrating a block configuration example of the PLD 2a of a fourth embodiment of the present invention. In FIG. 14, like parts to those of FIG. 2 are denoted by like reference symbols. A description is now provided of parts that are different from FIG. 2.

The entire structure of a neural network 81 illustrated in FIG. 14 is different from the structure of the neural network 12a. In other words, the neural network 81 having no association with the neural network 12a is formed in the PLD 2a.

A plurality of neural network 81 structures having an entire structure different from that of the neural network 12a are stored in the reconfiguration data memory 15.

As described above, the entire structure of the neural network 81 is different from that of the neural network 12a. Therefore, the PLD 2a can efficiently collect image data of the usage environment.

The function configuration of the above-mentioned recognition apparatus and learning system has been classified in accordance with the main processing content in order to allow the configuration of the recognition apparatus and the learning system to be understood more easily. The classification method and the names of the components are not limited to those in the present invention. The configuration of the recognition apparatus and the learning system may be classified into even more components in accordance with the processing content. One component can also be classified so that it can execute even more processes. The processing of each component may be executed by one piece of hardware, or by a plurality of pieces of hardware.

Each processing unit of the above-mentioned sequence has been divided in accordance with the main processing content in order to allow the processing of the recognition apparatus and the learning system to be understood more easily. The division method and the names of the processing units are not limited to those in the present invention. The processing of the recognition apparatus and the learning system may be divided into even more processing units in accordance with the processing content. One processing unit can also be divided so that it includes even more processes. The present invention can be provided as a program for implementing the functions of the recognition apparatus and the learning system, and also as a storage medium in which that program is stored.

A part or all of each of the above-mentioned configurations, functions, processing units, and the like may be implemented by hardware by, for example, designing an integrated circuit. The control lines and information lines considered to be necessary for the description are described, but it is not necessarily the case that all the control lines and information lines of a product have been described. It may be considered that in actual practice almost all parts are connected to each other.

The technical elements of the above-mentioned embodiments may be applied independently, or may be applied by being divided into a plurality of portions, such as a program portion and a hardware portion.

REFERENCE SIGNS LIST

1 VEHICLE, 2 ECU, 2a PLD, 3 LEARNING APPARATUS, 4 DB, 5 NETWORK, 11 INPUT UNIT, 12a NEURAL NETWORK, 12b NEURAL NETWORK, 13 COMPARISON UNIT, 14 COMMUNICATION UNIT, 15 RECONFIGURATION DATA MEMORY, 16 SEQUENCE DATA MEMORY, 17 RECONFIGURABLE CONTROLLER, 18 TIMER, 19 DATA MEMORY, 21 CONTROL UNIT, 22 R/W UNIT, 31a NEURAL NETWORK AREA, 31b NEURAL NETWORK AREA, 41 ADDRESS OUTPUT UNIT, 42 SEQUENCE CONTROLLER, 43 COPY ADDRESS MAP MEMORY, 51 STORAGE AREA, 52 STORAGE AREA, 53 CALCULATION AREA, 61 NEURAL NETWORK, 71 NEURAL NETWORK, 81 NEURAL NETWORK

The invention claimed is:

1. A recognition system, comprising:
   a host system comprising a database and a learning apparatus, wherein the learning apparatus is configured to periodically determine based on data stored in the database a neural network structure for a first neural network and a plurality of neural network structures for a second neural network, and transmit information on the neural network structures;
   a vehicle that captures a plurality of data comprising at least image data from a usage environment which undergoes periodic changes; and
   a programmable logic device connected to the vehicle and configured to periodically receive information on the neural network structures determined by the host system and the plurality of data from the usage environment captured by the vehicle, the programmable logic device comprising:
- a controller configured to generate and periodically reconfigure neural networks based on the information on neural network structures determined by the host system,
- a first neural network generated by the controller configured to receive input of the plurality of data from the usage environment and periodically generate a first output result, wherein the first output result is output to the vehicle to cause the vehicle to perform a predetermined vehicle control action, and
- a second neural network generated by the controller configured to receive input of the plurality of data from the usage environment and periodically generate a second output result, the second neural network having a different structure from a structure of the first neural network,
- wherein the programmable logic device is configured to compare the first output result and the second output result and to wirelessly transmit the plurality of data from the usage environment to the database of the host system when a comparison result between the first output result and the second output result is different by a predetermined standard or more,
- wherein the first neural network is configured to recognize a predetermined state of the usage environment based on the data captured by the vehicle and determine whether or not there is a dangerous condition in the usage environment, and wherein, when the first neural network determines that there is a dangerous condition in the usage environment, the programmable logic device outputs an instruction to the vehicle to perform an avoidance action to avoid the danger, and causes the vehicle to perform the avoidance action,
- wherein the controller is configured to reconfigure the structure of the second neural network to a different structure from among the plurality of neural network structures for a second neural network determined by the learning apparatus of the host system in accordance with a periodic instruction received from a timer and sequence data stored in the programmable logic device; and
- wherein the programmable logic device is configured compare the first output result and the second output result each time the controller reconfigures the structure of the second neural network and to wirelessly transmit the plurality of data from the usage environment to the database of the host system according to the comparison result between the first output result and the second output result.

2. The recognition system according to claim 1, wherein the programmable logic device is configured to store the second neural network having a different structure, and
  wherein the controller is configured to change the second neural network to the different structure by referring to a second neural network having a different structure stored within the programmable logic device.

3. The recognition system according to claim 1, wherein a part of a structure of each layer of the second neural network is different from a structure of the first neural network.

4. The recognition system according to claim 1, wherein a first part of the structure of the second neural network, in a separate layer from a second part of the structure of the second neural network, is different from a structure of the first neural network.

5. The recognition system according to claim 1, wherein an entire structure of at least one layer of the second neural network is different from a structure of the first neural network.

6. The recognition system according to claim 1, wherein an entire structure of the second neural network is different from a structure of the first neural network.

7. A learning system, comprising:
- a learning apparatus configured to periodically determine a first neural network structure and a plurality of second neural network structures, and transmit information on the first neural network structure and plurality of second neural network structures;
- a usage environment which undergoes periodic changes and generates a plurality of data;
- a vehicle that captures the plurality of data comprising at least image data from the usage environment, wherein the vehicle contains a programmable logic device configured to:
  - receive from the learning apparatus the first neural network structure via a network and generate a first neural network based on the first neural network structure, first neural network configured to receive input of the plurality of data from the usage environment and periodically generate a first output result, wherein the first output result is output to the vehicle to cause the vehicle to perform a predetermined vehicle control action;
  - receive a second neural network structure from among the plurality of second neural network structures via a network and generate a second neural network based on the second neural network structure, wherein the second neural network is configured to receive input of the plurality of data from the usage environment and periodically generate a second output result, and wherein the second neural network has a different structure from a structure of the first neural network,
  - receive input of the plurality of data captured by the vehicle and using the second neural network, extract feature data from the plurality of data;
  - transmit the extracted feature data via the network; and
  - change, via a controller, the second neural network to a different structure based on the extracted feature data, wherein the programmable logic device changes the second neural network in accordance with a periodic instruction received from a timer and sequence data stored in the programmable logic device;
  - wherein the first neural network is configured to recognize a predetermined state of the usage environment based on the data captured by the vehicle and determine whether or not there is a dangerous condition in the usage environment, and wherein, when the first neural network determines that there is a dangerous condition in the usage environment, the programmable logic device outputs an instruction to the vehicle to perform an avoidance action in order to avoid the danger, and causes the vehicle to perform the avoidance action.

* * * * *